US012687213B2

(12) United States Patent
Ho et al.

(10) Patent No.: US 12,687,213 B2
(45) Date of Patent: Jul. 21, 2026

(54) MUFFLER DEVICE FOR A BICYCLE SUSPENSION SYSTEM

(71) Applicant: SRAM, LLC, Chicago, IL (US)

(72) Inventors: Shu-Wei Ho, Taichung (TW); Wei-Kai Liao, Taichung (TW)

(73) Assignee: SRAM, LLC, Chicago, IL (US)

( * ) Notice: Subject to any disclaimer, the term of this patent is extended or adjusted under 35 U.S.C. 154(b) by 320 days.

(21) Appl. No.: 17/551,396

(22) Filed: Dec. 15, 2021

(65) Prior Publication Data

US 2022/0196105 A1    Jun. 23, 2022

Related U.S. Application Data

(60) Provisional application No. 63/126,730, filed on Dec. 17, 2020.

(51) Int. Cl.
*F16F 9/34* (2006.01)
*B62K 25/08* (2006.01)
*G10K 11/16* (2006.01)

(52) U.S. Cl.
CPC ............ *F16F 9/341* (2013.01); *G10K 11/161* (2013.01); *B62K 25/08* (2013.01)

(58) Field of Classification Search
CPC ....... F16F 9/341; G10K 11/161; B62K 25/06; B62K 25/08; B62K 25/10
USPC .................................. 280/274–280, 283–286
See application file for complete search history.

(56) References Cited

U.S. PATENT DOCUMENTS

| | | | | |
|---|---|---|---|---|
| 4,085,832 A * | 4/1978 | Gaines | .................... | F16F 3/093 |
| | | | | 267/140 |
| 5,472,072 A * | 12/1995 | Bumgarner | ............. | F16F 9/003 |
| | | | | 277/928 |
| 8,123,006 B1 * | 2/2012 | Schroeder | ................. | F16F 9/48 |
| | | | | 188/322.19 |
| 2009/0322054 A1 * | 12/2009 | Becker | .................... | F16F 9/468 |
| | | | | 188/282.1 |
| 2015/0247545 A1 * | 9/2015 | Anderson | ............... | F16F 9/341 |
| | | | | 188/313 |
| 2018/0209506 A1 * | 7/2018 | Sikora | ................... | F16F 9/3484 |

FOREIGN PATENT DOCUMENTS

| | | |
|---|---|---|
| CN | 101975326 | 1/2012 |
| CN | 107339360 | 11/2018 |
| JP | 20025212 | 1/2002 |

OTHER PUBLICATIONS

English translation of CN 101975326, accessed Sep. 18, 2024 via Espacenet <https://translationportal.epo.org/emtp/translate/?ACTION=description-retrieval&COUNTRY=CN&ENGINE=google&FORMAT=docdb&KIND=A&LOCALE=en_EP&NUMBER=101975326&OPS=ops.epo.org/3.2&SRCLANG=zh&TRGLANG=en> (Year: 2012).*

* cited by examiner

*Primary Examiner* — Jeremy A Luks

(57) ABSTRACT
A muffler device for use in a bicycle suspension system that has an axis is presented. The device includes a flow path permitting a pressurized fluid to flow therethrough, and a muffler member having a porous surface that at least partially defines the flow path. The device is provided to dampen the acoustic energy of the system.

15 Claims, 9 Drawing Sheets

11

MUFFLER DEVICE FOR A BICYCLE SUSPENSION SYSTEM

PRIORITY

This application claims the benefit of U.S. Provisional Patent Application No. 63/126,730, filed Dec. 17, 2020, the contents of which are hereby incorporated by reference in their entirety.

FIELD

The disclosure relates to a muffler, and more particularly to a muffler device for a bicycle suspension system.

BACKGROUND

Suspension systems for bicycles may include a spring module and a damper module. When the bicycle travels on an uneven surface, the spring module would be compressed and then rebounds. The damper module serves to damp the rebound action of the spring module to improve user control on the bicycle. Specifically, the damper module includes a movable piston that forces a pressurized damping fluid to flow from a compressing space to an expanding space via at least one through hole formed in the piston during the rebound action of the spring module. However, when the damping fluid flows through the through hole of the piston, a frictional, relative movement between the piston and pressurized air mixed with the damping fluid may generate damping noise.

To reduce the damping noise, a closed damping system which has no air therein may be employed. Increasing the dimension of the through hole of the piston can reduce the damping noise as well. However, the closed damping system is costly, and a rebound piston with a relatively large through hole is adverse to the performance of the damper module.

SUMMARY

Therefore, an object of the disclosure is to provide a muffler device that can alleviate at least one of the drawbacks of the prior arts.

According to the disclosure, the muffler device is for use in a bicycle suspension system that has an axis. The muffler device includes a flow path permitting a pressurized fluid to flow therethrough, and a muffler member having a porous surface that at least partially defines the flow path.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
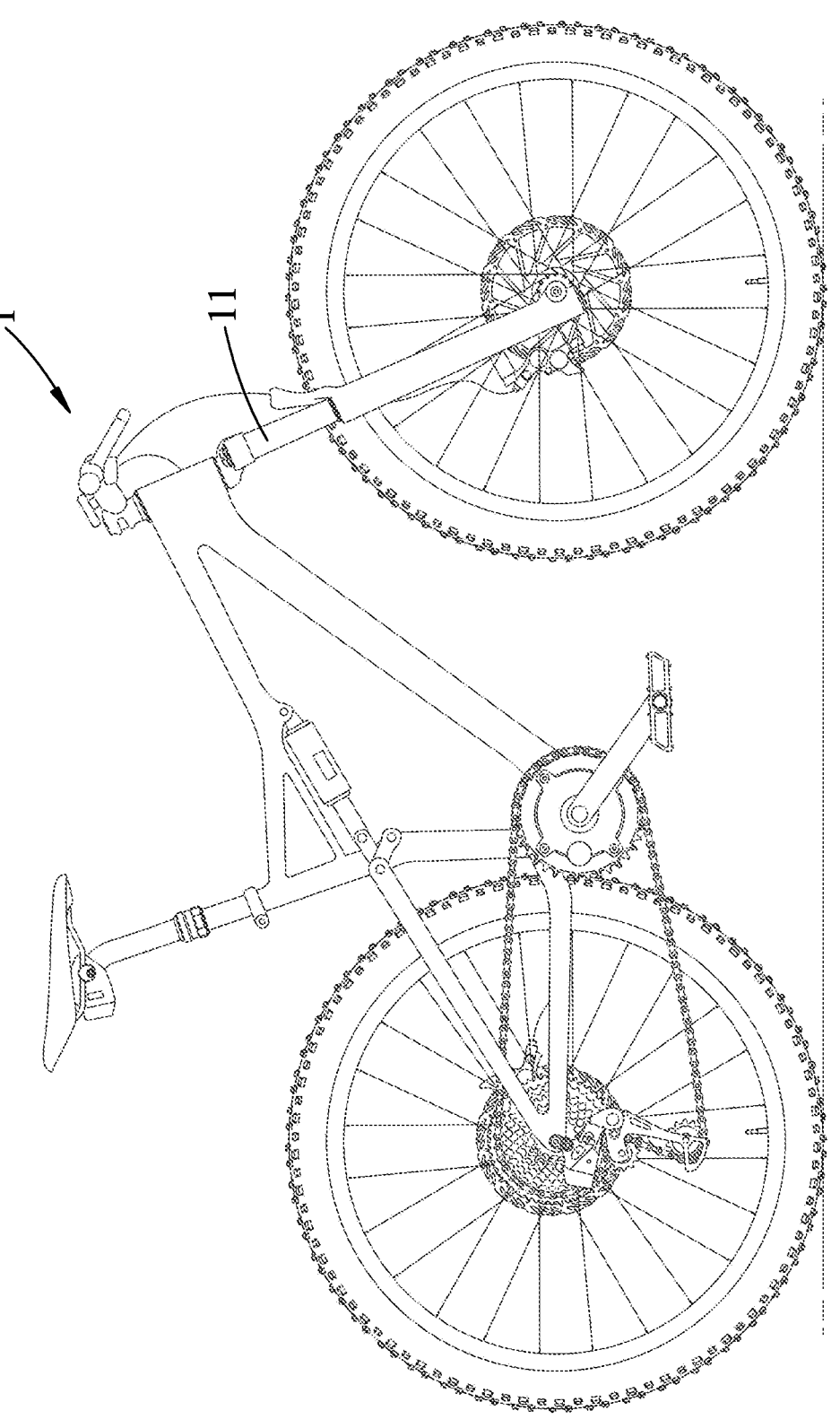
FIG. 1 is a side view illustrating a bicycle.
Figure 2:
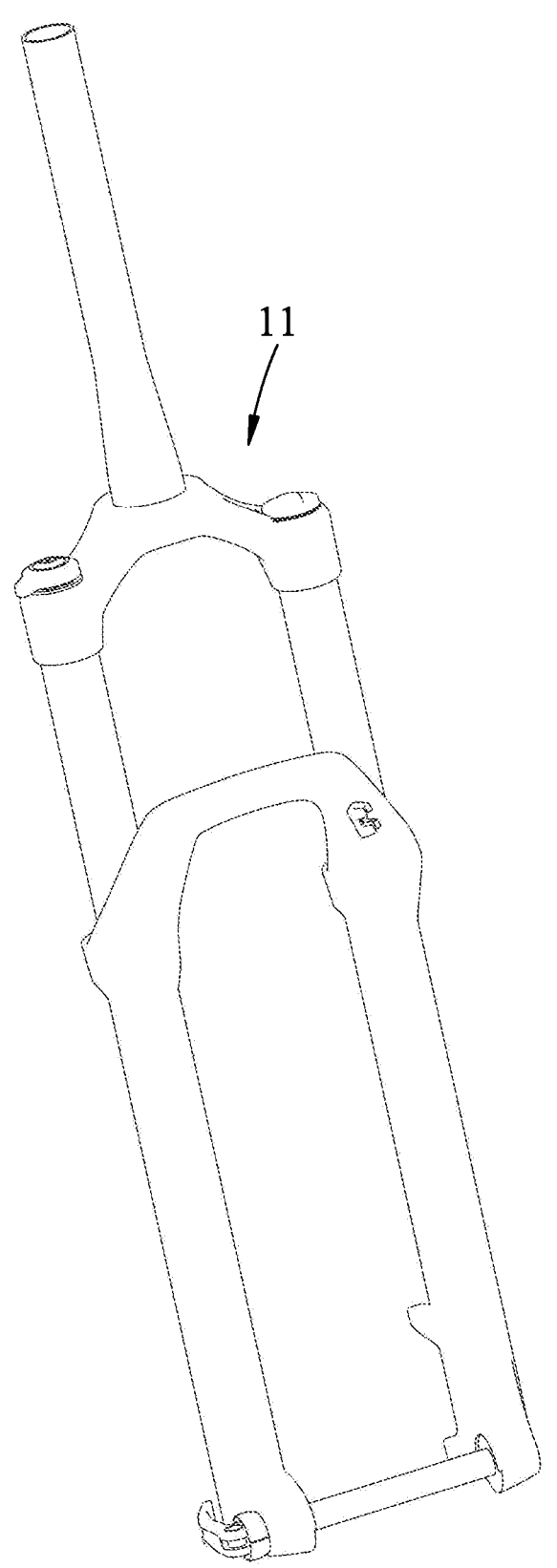
FIG. 2 is a perspective view illustrating a suspension system of the bicycle.
Figure 3:
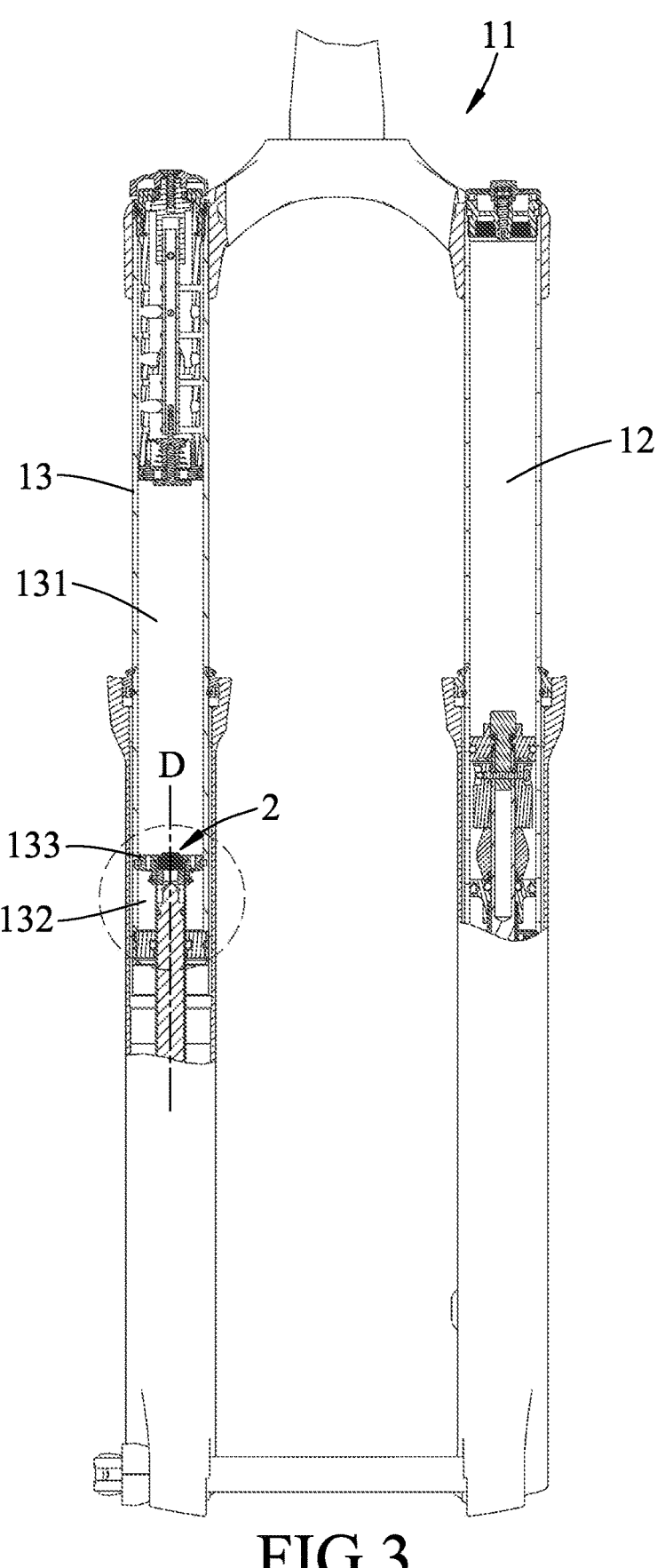
FIG. 3 is a fragmentary, partly sectional view of the suspension system.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 4, the muffler device 2 (see FIGS. 3 and 4) according to the disclosure is used in a suspension system 11 of a bicycle 1. The suspension system 11 includes a spring module 12 and a damper module 13. The damper module 13 includes a movable damping piston 133 that has an axis (D) and that defines a first chamber 131 and a second chamber 132 respectively at two opposite sides thereof along the axis (D). The muffler device 2 is mounted to the damping piston 133, and defines a flow path 21 therethrough. During the rebound action of the spring module 12, the damping piston 133 moves to compress the second chamber 132 and to expand the first chamber 131 so as to force a damping fluid to flow from the second chamber 132 to the first chamber 131 via the flow path 21 of the muffler device 2. The muffler device 2 may be used in other damper modules of different configurations. In a modification, the muffler device 2 may define a plurality of flow paths 21 therethrough for the damping fluid to flow from the second chamber 132 to the first chamber 131.

Figure 4:
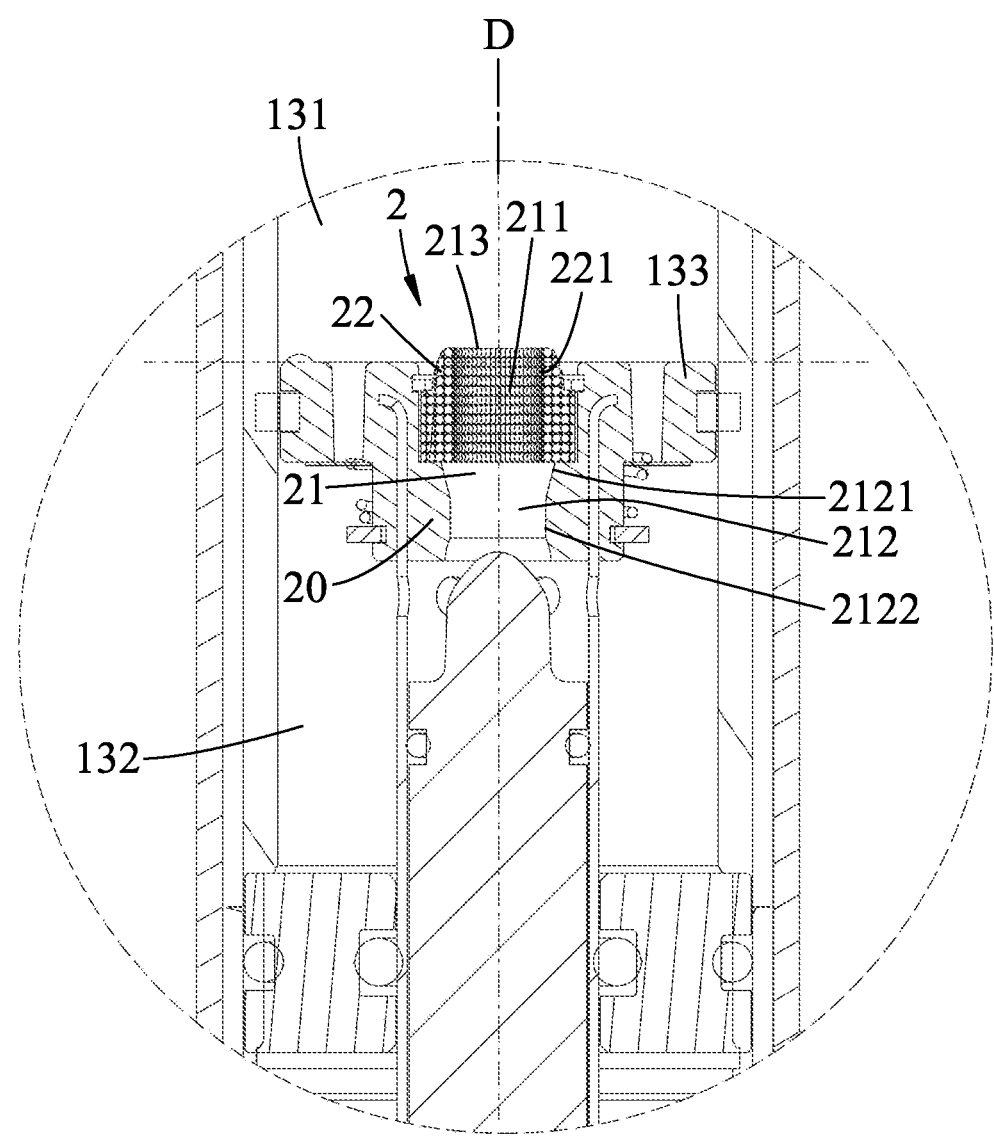
FIG. 4 is an enlarged sectional view of FIG. 3, illustrating the muffler device according to the disclosure used in the suspension system.
Figure 5:
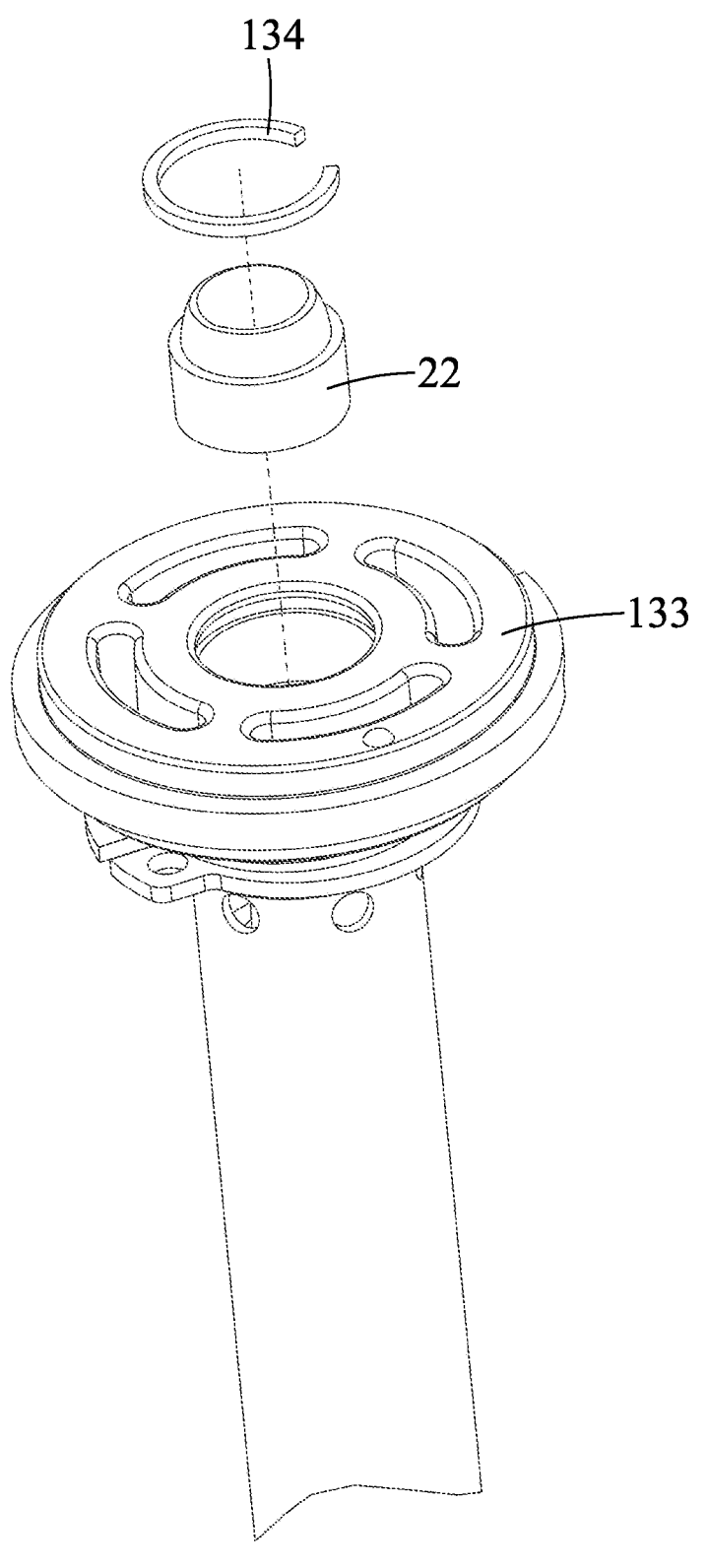
FIG. 5 is a fragmentary, partly exploded perspective view illustrating a muffler member of the muffler device.

With particular reference to FIG. 4, the muffler device 2 includes a tubular member 20, and a muffler member 22 that is disposed downstream of the tubular member 20 and that cooperates with the tubular member 20 to define the flow path 21. Specifically, the flow path 21 has a guide path portion 212, and a porous path portion 211 disposed downstream of the guide path portion 212. The tubular member 20 defines the guide path portion 212 therethrough. The muffler member 22 has a porous inner surface 221 that defines the porous path portion 211 which extends through the muffler member 22. The muffler member 22 may be made of copper, plastic, ceramic or other materials, through a sintering process. In one embodiment, the tubular member 20 is integrally formed with the damping piston 133. In one embodiment, the muffler member 22 is positioned relative to the damping piston 133 by a C-clip 134 (see FIG. 5), and is disposed adjacent to an exit opening 213 of the flow path 21. In one embodiment, the flow path 21 extends along the axis (D) of the damping piston 133.

The guide path portion 212 of the flow path 21 has a first flow open dimension at a first point 2121 adjacent to the porous path portion 211 that is greater than a minimum flow open dimension within the porous path portion 211, and a second flow open dimension at a second point 2122 upstream of the first point 2121 that is smaller than the first flow open dimension. In one embodiment, the second flow open dimension of the guide path portion 212 is substantially the same as the minimum flow open dimension within the porous path portion 211. The inner surface 221 of the muffler member 22 includes a plurality of pores that are periodically-disposed. In a modification (see FIG. 6), the inner surface 221 of the muffler member 22 includes a plurality of pores that are stochastically-disposed.

Figure 6:
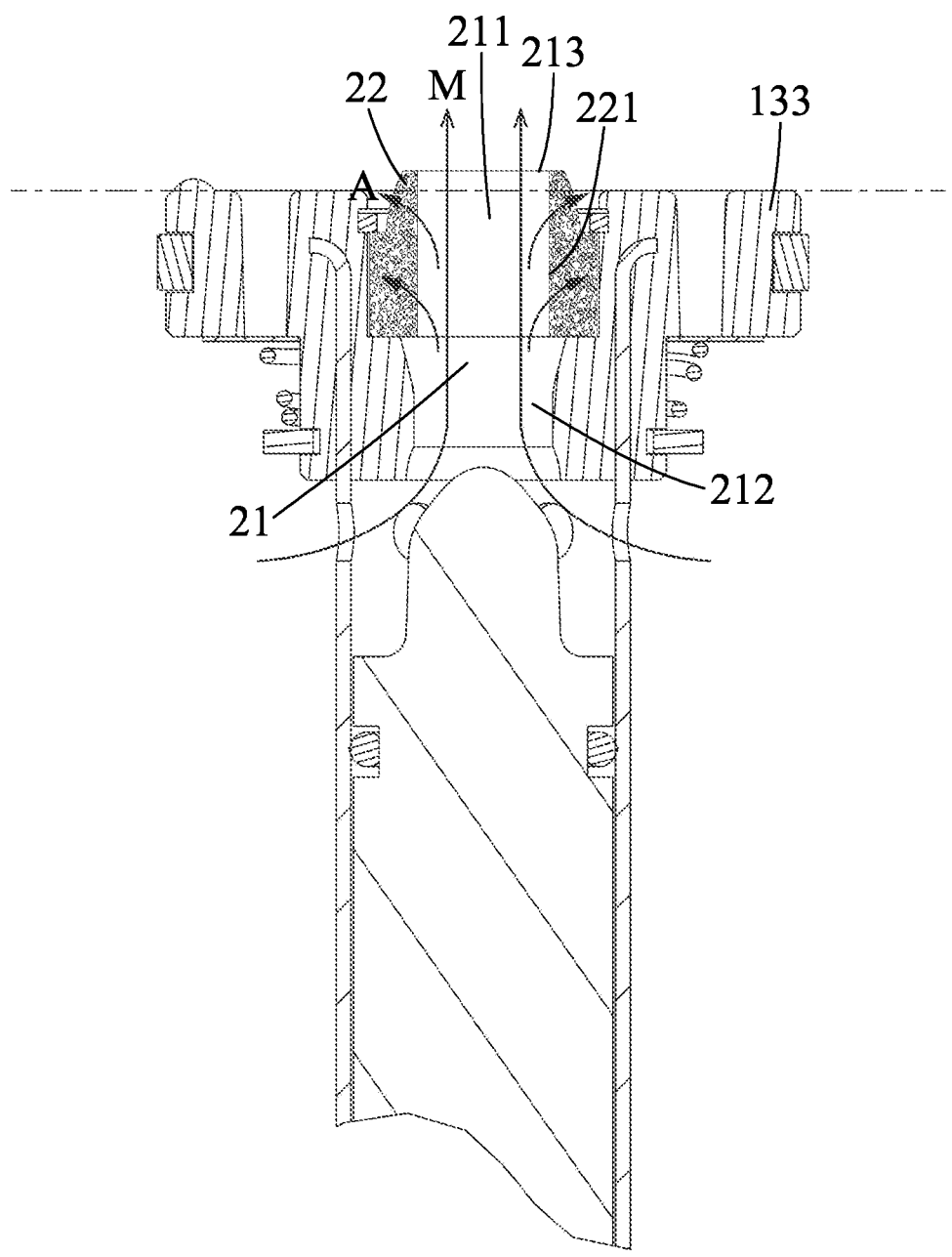
FIG. 6 is a fragmentary sectional view illustrating a damping fluid flowing through the muffler device.

Referring to FIG. 6, during the rebound action of the spring module 12 (see FIG. 3), the damping fluid is forced by the damping piston 133 to flow into the guide path portion 212, decelerates before entering the porous path portion 211 (since the open dimension of the guide path portion 212 expands), and then flows through the porous path portion 211, such that a main flow (indicated by arrow (M)) of the damping fluid flows through the exit opening 213 of the flow path 21 into the first chamber 131 (see FIG. 4), and that pressurized air (indicated by arrow (A)) mixed with the damping fluid flows through the porous inner surface 221 of the muffler member 22 so as to reduce friction between the pressurized air and the damping piston 133 to thereby reduce damping noise.

In one embodiment, the muffler member 22 has a porous structure throughout a depth extending radially outwardly from the porous surface 221. Similarly, the porous structure may include periodically-disposed pores or stochastically-disposed pores. In one embodiment, the guide path portion 212 may be omitted, and the whole flow path 21 is defined within the muffler member 22. In one embodiment, only a portion of the inner surface 221 of the muffler member 22 is porous.

Figure 7:
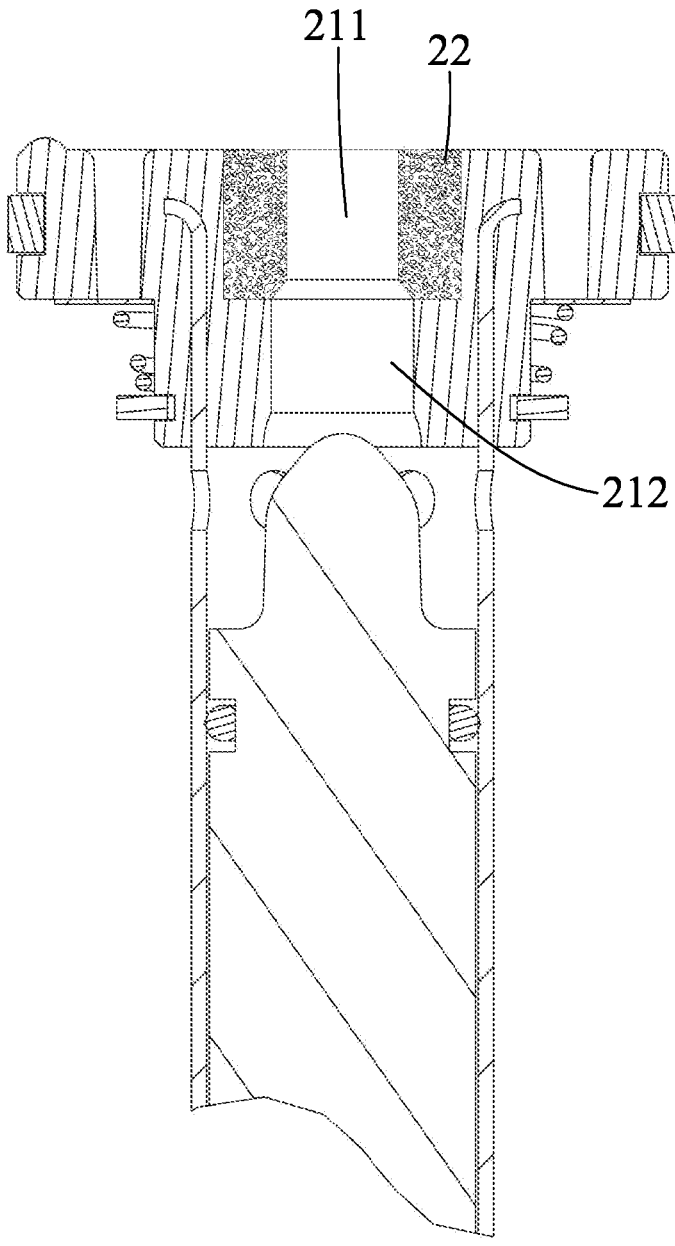
FIG. 7 is a fragmentary sectional view illustrating a modification of the muffler device according to the disclosure.

Referring to FIG. 7, a modification of the muffler device 2 according to the disclosure is configured such that, the guide path portion 212 does not expand toward the muffler member 22, and a minimum open dimension within the guide path portion 212 is greater than a minimum open dimension within the porous path portion 211.

Figure 8:
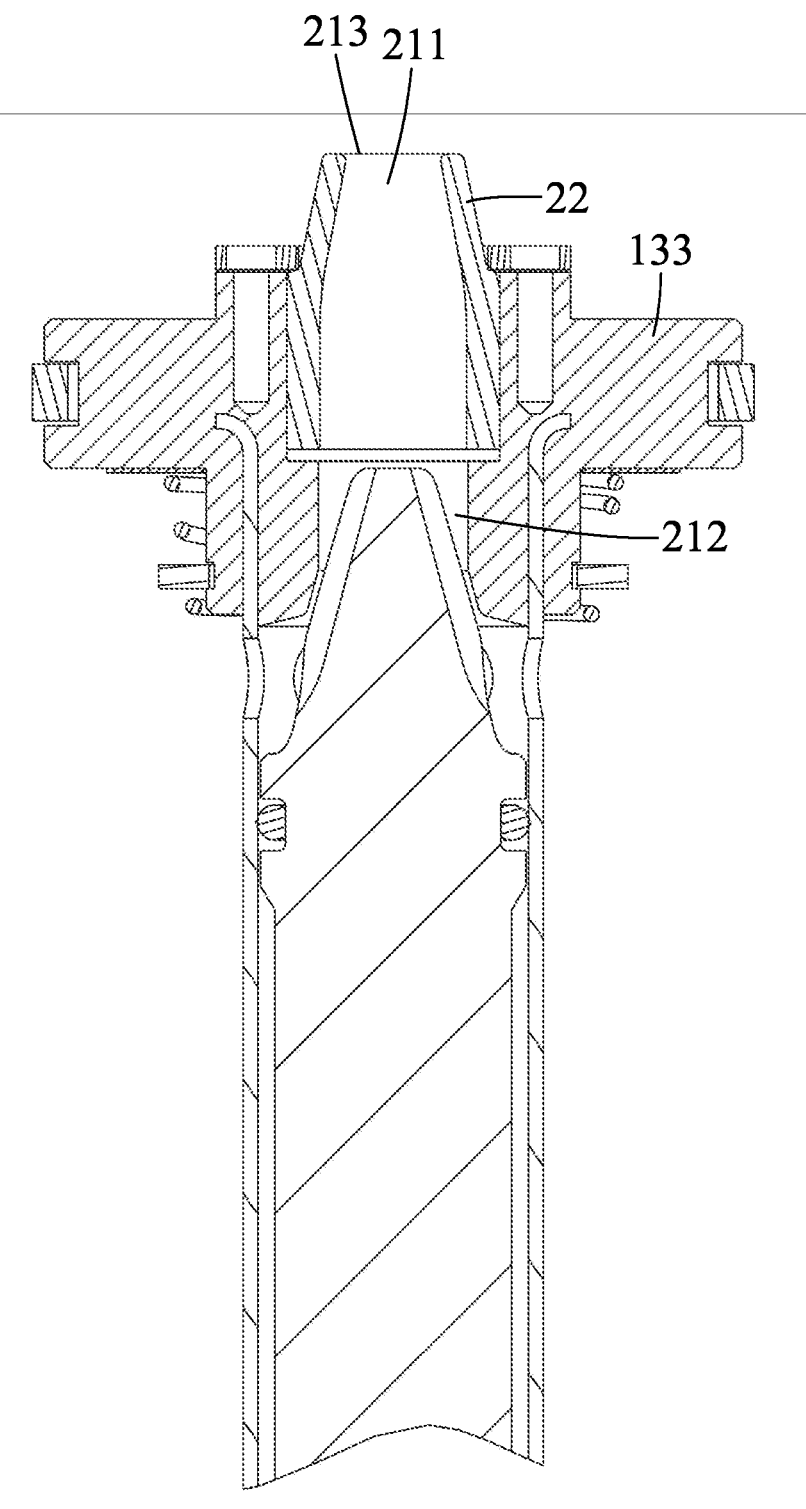
FIG. 8 is a fragmentary sectional view illustrating another modification of the muffler device according to the disclosure.
Figure 9:
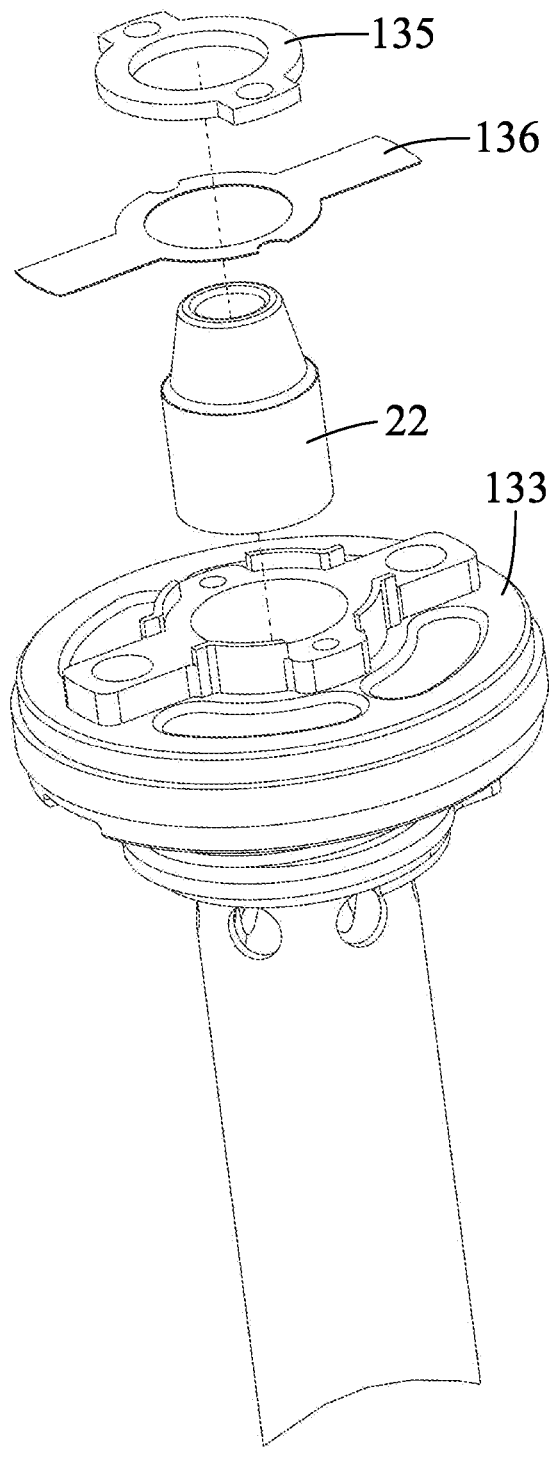
FIG. 9 is a fragmentary, partly exploded perspective view illustrating the muffler member of the modification in FIG. 8.

Referring to FIGS. 8 and 9, another modification of the muffler device 2 according to the disclosure is configured such that, the muffler member 22 projects out of an end surface of the damping piston 133 opposite to the guide path portion 212, and the porous path portion 211 converges toward the exit opening 213 of the flow path 21. In this modification, the muffler member 22 is positioned relative to the damping piston 133 by an annular clasp 135 and a gasket 136.

In summary, by virtue of the porous surface 221 or the porous structure of the muffler member 22, the pressurized air can flow through the muffler member 22 so as to reduce the friction between the pressurized air and the damping piston 133 to thereby reduce the damping noise during the rebound action of the spring module 12. The muffler device 2 according to the disclosure has a relatively simple structure, and is low-cost compared with a closed damping system. Moreover, the muffler device 2 can be easily added onto a conventional damping module of a bicycle suspension system to reduce the damping noise without affecting the performance of the damper module.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A muffler device adapted for use in a bicycle suspension system, the muffler device comprising:
    a flow path permitting a damping fluid to flow therethrough from a second chamber to a first chamber during a rebound action; and
    a muffler member comprising:
        a porous surface that at least partially defines the flow path; and
        an exit opening defining an open dimension into the first chamber; wherein the flow path comprises:
        a porous path portion defined by the porous surface of the muffler member; and
        a guide path portion disposed upstream of the porous path portion, the guide path portion having a first flow open dimension at a first point adjacent to the porous path portion that is greater than a minimum flow open dimension within the porous path portion, and a second flow open dimension at a second point upstream of the first point that is smaller than the first flow open dimension.

2. The muffler device as claimed in claim 1, wherein the muffler member has a porous structure throughout a depth extending from the porous surface.

3. The muffler device as claimed in claim 2, wherein the porous structure of the muffler member includes a plurality of pores that are periodically-disposed.

4. The muffler device as claimed in claim 2, wherein the porous structure of the muffler member includes a plurality of pores that are stochastically-disposed.

5. The muffler device as claimed in claim 2, wherein the muffler member is made through a sintering process.

6. The muffler device as claimed in claim 1, wherein the muffler member is disposed adjacent to an exit opening of the flow path.

7. The muffler device as claimed in claim 1, wherein the second flow open dimension of the guide path portion is substantially the same as the minimum flow open dimension within the porous path portion.

8. The muffler device as claimed in claim 1, wherein the porous path portion that is defined by the porous surface of the muffler member converges toward the exit opening.

9. The muffler device as claimed in claim 1, wherein the flow path extends along an axis of the bicycle suspension system.

10. A damper module for a bicycle, the damper module comprising:
    a movable damping piston defining a first chamber and a second chamber at two opposites thereof; and
    a muffler device defining a flow path in a rebound direction between the first chamber and the second chamber, the muffler device comprising a muffler member having a porous surface that at least partially defines the flow path and an exit opening defining an open dimension into the first chamber; wherein the flow path comprises:

a porous path portion defined by the porous surface of the muffler member, the porous path portion defining a minimum flow dimension; and a guide path portion disposed upstream of the porous path portion, wherein the guide path portion comprises:

a first flow open dimension at a first point adjacent to the porous path portion that is greater than the minimum flow dimension of the porous path portion; and a second flow open dimension at a second point upstream of the first point that is smaller than the first flow open dimension.

11. The damper module of claim 10, wherein the muffler member has a porous structure throughout a depth extending from the porous surface.

12. The damper module of claim 10, wherein the muffler device is mounted to the movable damping piston.

13. The damper module of claim 10, wherein at least a portion of the muffler device is integrally formed with the damping piston.

14. A muffler device for use in a bicycle suspension system, the muffler device comprising:

a flow path permitting a pressurized fluid to flow therethrough, the flow path comprising:

a porous path portion defined by the porous surface of the muffler member, the porous path portion defining a minimum flow open dimension; and a guide path portion disposed upstream of the porous path portion, wherein the guide path portion comprises:

a first flow open dimension at a first point adjacent to the porous path portion that is greater than the minimum flow open dimension of the porous path portion;

a second flow open dimension at a second point upstream of the first point that is smaller than the first flow open dimension; and a muffler member having a porous surface that at least partially defines the flow path.

15. The muffler device of claim 14, wherein the second flow open dimension of the guide path portion is substantially the same as the minimum flow open dimension within the porous path portion.

\* \* \* \* \*